(12) United States Patent
Low et al.

(10) Patent No.: US 9,094,055 B2
(45) Date of Patent: Jul. 28, 2015

(54) WIRELESS POWER TRANSMITTER TUNING

(75) Inventors: Zhen Ning Low, San Diego, CA (US); Charles Edward Wheatley, III, Del Mar, CA (US); Sreenivas Kasturi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 764 days.

(21) Appl. No.: 13/399,292

(22) Filed: Feb. 17, 2012

(65) Prior Publication Data

US 2012/0267960 A1 Oct. 25, 2012

Related U.S. Application Data

(60) Provisional application No. 61/477,109, filed on Apr. 19, 2011.

(51) Int. Cl.
*H01F 38/00* (2006.01)
*H04B 5/00* (2006.01)
*H02J 17/00* (2006.01)

(52) U.S. Cl.
CPC ............. *H04B 5/0037* (2013.01); *H02J 17/00* (2013.01)

(58) Field of Classification Search
CPC .......... H01F 27/42; H01F 37/00; H01F 38/00
USPC ...................................................... 307/104
See application file for complete search history.

(56) References Cited

U.S. PATENT DOCUMENTS

| | | | |
|---|---|---|---|
| 7,107,026 B2 | 9/2006 | Pinks | |
| 7,211,986 B1 | 5/2007 | Flowerdew et al. | |
| 2007/0298846 A1* | 12/2007 | Greene et al. | 455/572 |
| 2009/0243397 A1* | 10/2009 | Cook et al. | 307/104 |
| 2009/0284220 A1 | 11/2009 | Toncich et al. | |
| 2010/0109443 A1 | 5/2010 | Cook et al. | |
| 2010/0141042 A1* | 6/2010 | Kesler et al. | 307/104 |
| 2010/0244577 A1 | 9/2010 | Shimokawa | |
| 2011/0148215 A1 | 6/2011 | Marzetta et al. | |

(Continued)

FOREIGN PATENT DOCUMENTS

| | | |
|---|---|---|
| JP | 2007228794 A | 9/2007 |
| WO | WO-2010093997 A1 | 8/2010 |
| WO | WO-2010117665 A2 | 10/2010 |

OTHER PUBLICATIONS

International Search Report and Written Opinion—PCT/US2012/033956—ISA/EPO—Jul. 23, 2012.

(Continued)

*Primary Examiner* — Rexford Barnie
*Assistant Examiner* — Joseph Inge
(74) *Attorney, Agent, or Firm* — Knobbe, Martens, Olson & Bear, LLP

(57) ABSTRACT

This disclosure provides systems, methods and apparatus for tuning a wireless power transmitter. In one aspect an apparatus configured to wirelessly provide power to a load is provided. The apparatus includes a transmit circuit including a transmit coil. The transmit circuit is configured to wirelessly provide power to the load. The transmit coil is configured to resonate at a resonant frequency. The transmit circuit has a reactance. The apparatus further includes a detection circuit configured to detect a change in the resonant frequency while providing power to the load. The apparatus further includes a tuning circuit configured to adjust the reactance based on the change.

34 Claims, 14 Drawing Sheets

(56) References Cited

U.S. PATENT DOCUMENTS

| | | |
|---|---|---|
| 2011/0234011 A1 | 9/2011 | Yi et al. |
| 2011/0241437 A1 | 10/2011 | Kanno |
| 2011/0266882 A1 | 11/2011 | Yamamoto et al. |
| 2011/0278945 A1 | 11/2011 | Wheatley, III |
| 2012/0038220 A1 | 2/2012 | Kim et al. |
| 2012/0049642 A1 | 3/2012 | Kim et al. |
| 2013/0342025 A1* | 12/2013 | Cook et al. .................... 307/104 |

OTHER PUBLICATIONS

Second Written Opinion from International Patent Application No. PCT/US2012/033956, Dated Apr. 30, 2013, 6 pp.

* cited by examiner

WIRELESS POWER TRANSMITTER TUNING

CROSS REFERENCE TO RELATED APPLICATIONS

This application claims priority under 35 U.S.C. §119(e) to U.S. Provisional Patent Application No. 61/477,109 entitled "MAXIMIZING EFFICIENCY VIA SWITCHED PARASITIC REACTANCE TUNING OF TRANSMITTING COIL" filed on Apr. 19, 2011, the disclosure of which is hereby incorporated by reference in its entirety.

FIELD

The present invention relates generally to wireless power. More specifically, the disclosure is directed to tuning a wireless power transmitter.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus configured to wirelessly provide power to a load. The apparatus includes a transmit circuit including a transmit coil. The transmit circuit is configured to wirelessly provide power to the load. The transmit circuit is further configured to resonate at a resonant frequency. The transmit circuit has a reactance. The apparatus further includes a detection circuit configured to detect a change in the resonant frequency while providing power to the load. The apparatus further includes a tuning circuit configured to adjust the reactance based on the change.

Another aspect of the disclosure provides an implementation of a method of tuning a wireless power transmitter. The method includes detecting a change in a resonant frequency of a transmit circuit including a transmit coil of the wireless power transmitter while wirelessly providing power to a first device. The method further includes adjusting a tuning reactance of the transmit circuit based on the detection while wirelessly providing power to the first device.

Yet another aspect of the disclosure provides an apparatus configured to wirelessly provide power to a load. The apparatus includes means for wirelessly transmitting power to the load. The means for wirelessly transmitting power is configured to resonate at a resonant frequency. The means for wirelessly transmitting power has a reactance. The apparatus further includes means for detecting a change in the resonant frequency while providing power to the load. The apparatus further includes means for tuning configured to adjust the reactance based on the change.

Figure 1:
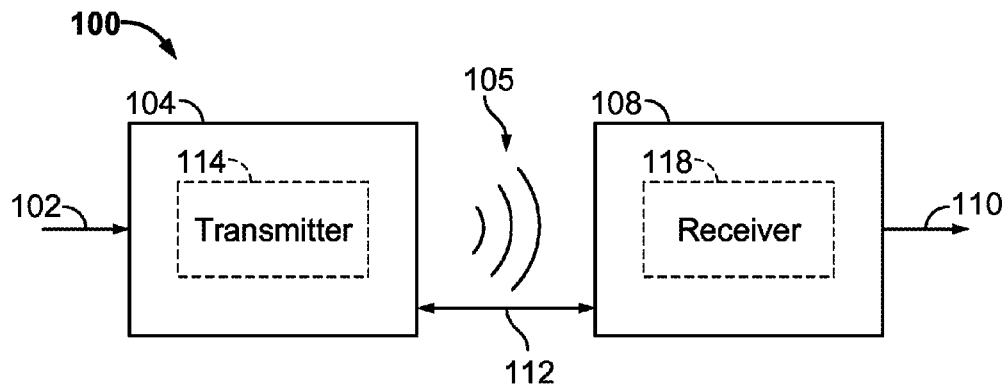
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
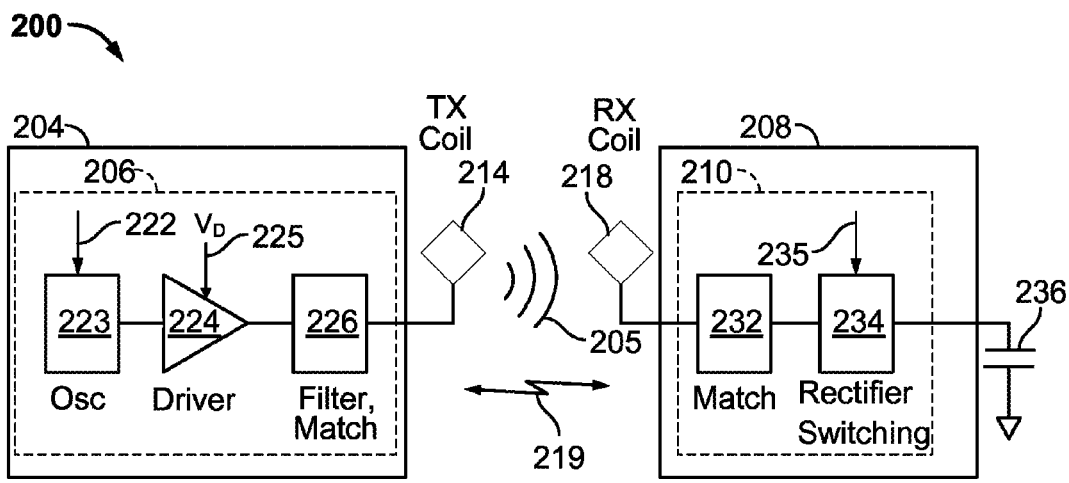
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 223, a driver circuit 224, and a filter and matching circuit 226. The oscillator 223 may be configured to generate a signal at a desired frequency, such as 468.75 KHz, 6.78 MHz or 13.56 MHz, that may be adjusted in response to a frequency control signal 222. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 223 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
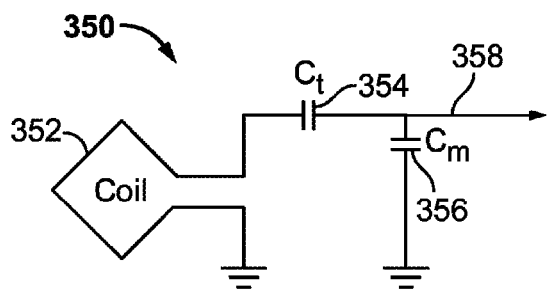
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a component that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). An air core coil 352 allows the placement of other components within the core area. Air core coils may be somewhat susceptible to detuning when certain types of extraneous physical devices are placed in the vicinity of the core. However, an air core may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 354 and capacitor 356 may be added to the transmit or receive circuitry 350 to create a resonant circuit that selects a signal 358 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other components are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
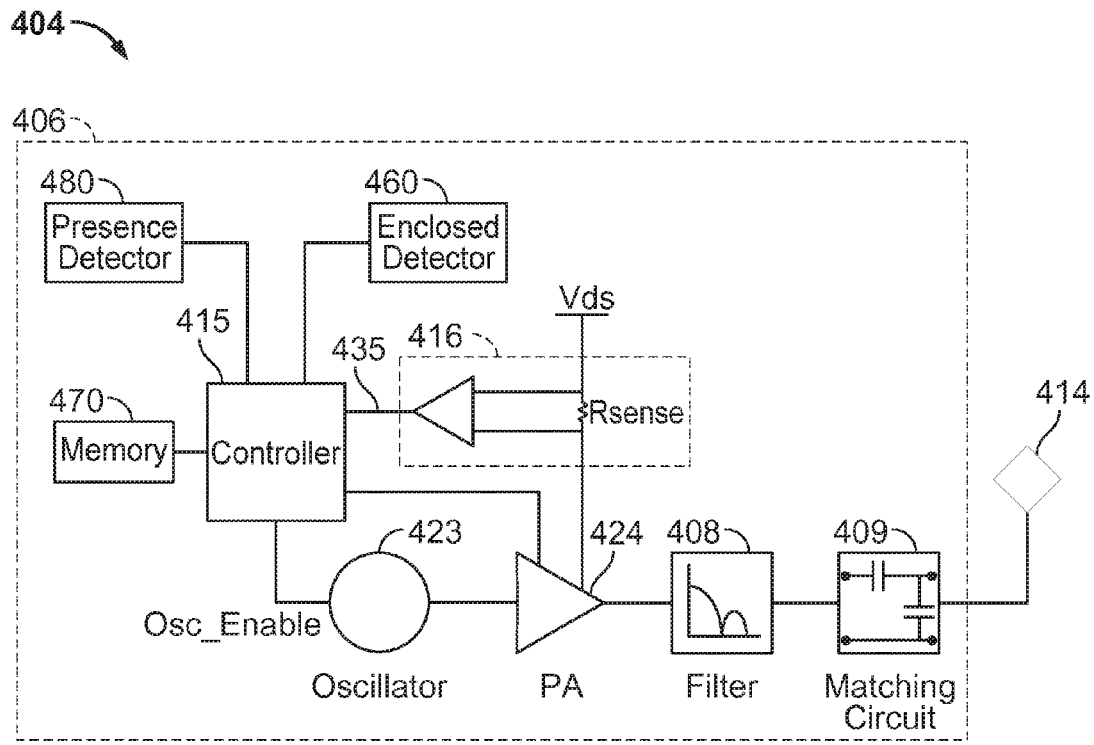
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
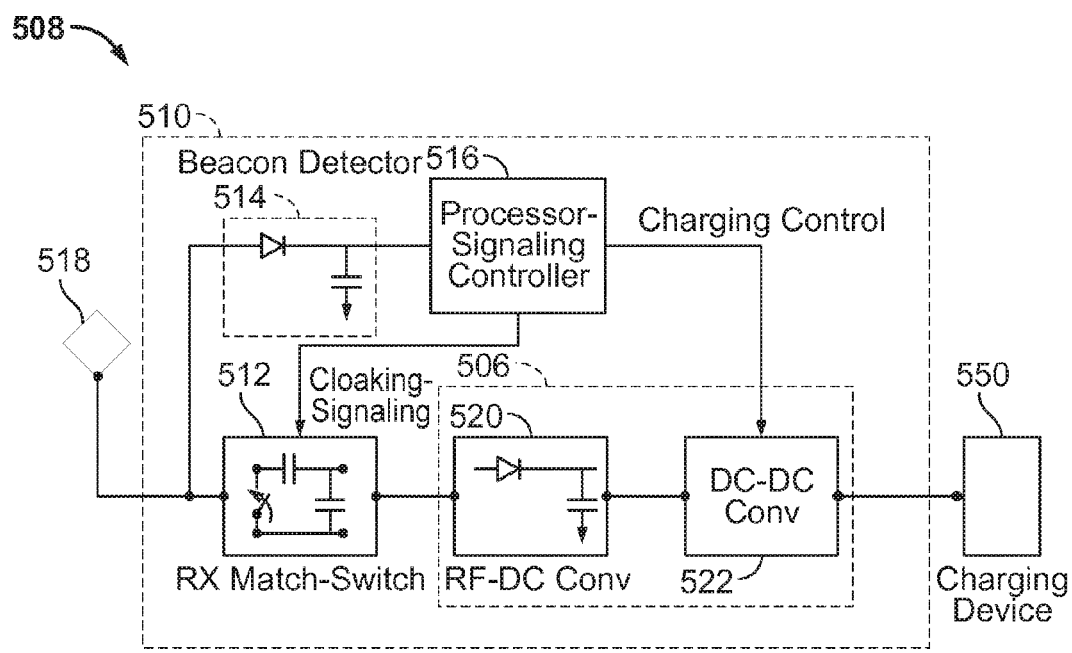
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 µsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
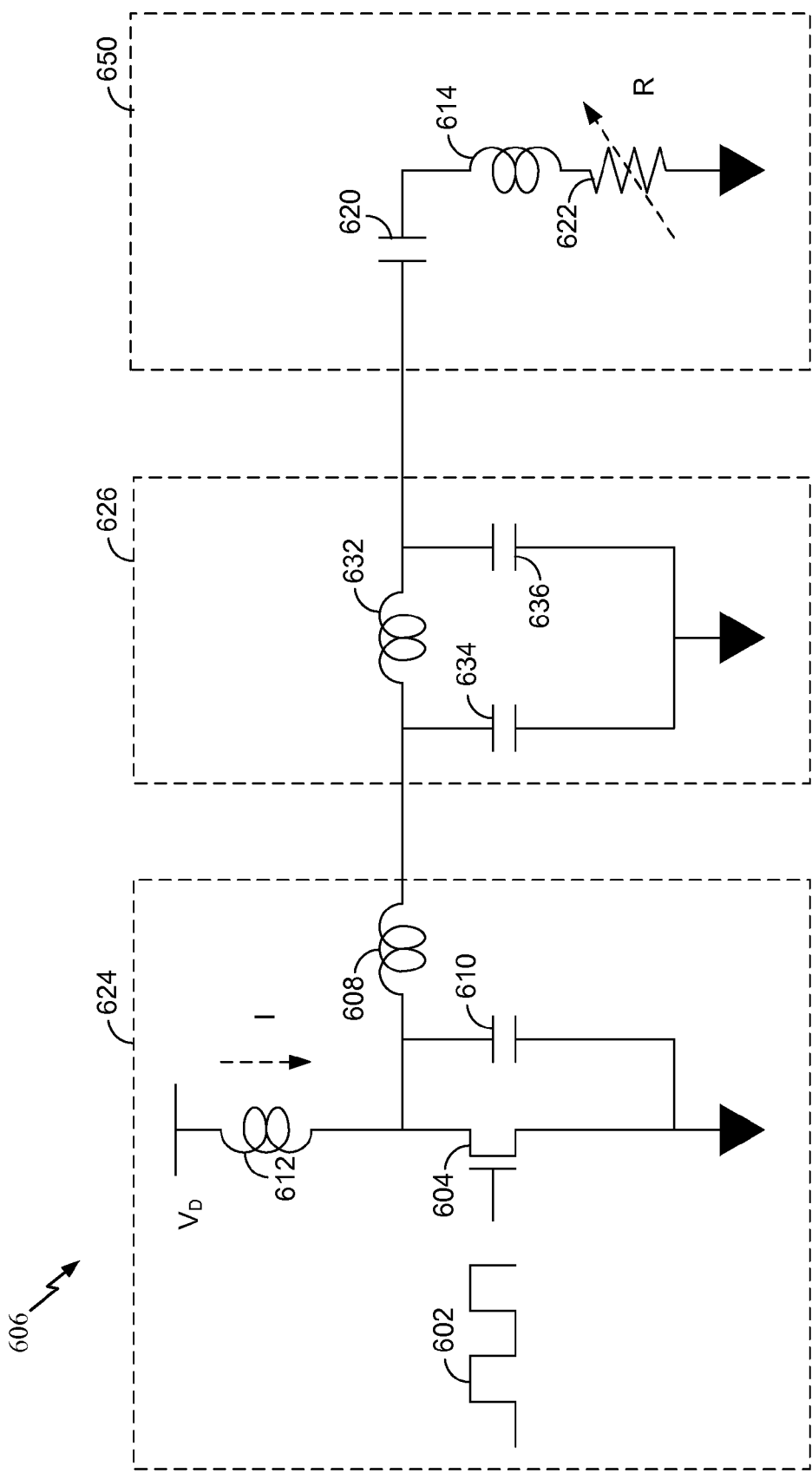
FIG. 6 is a schematic diagram of a portion of transmit circuitry that may be used in the transmit circuitry of FIG. 4.

FIG. 6 is a schematic diagram of a portion of transmit circuitry 606 that may be used in the transmit circuitry 406 of FIG. 4. The transmit circuitry 606 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier; however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 606 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising a coil 614. The transmit circuit 650 may include a series resonant circuit having a capacitance 620 and inductance (e.g., that may be due to the inductance or capacitance of the coil or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Various exemplary embodiments of the present invention, as described herein, relate to systems, devices, and methods for tuning a resonant frequency of a transmit circuit 650 of the transmit circuitry a transmitter 404 (FIG. 4). According to one exemplary embodiment, a transmit circuit 650 may be configured to selectively include one or more reactive elements for tuning a resonant frequency of the transmitter to a desired frequency. Furthermore, according to another exemplary embodiment, a transmit circuit 650 may inductively couple with one or more parasitic coils (not shown) that may be a part of the transmitter 404 for tuning a resonant frequency of the transmit circuit 650 to a desired frequency. According to yet another exemplary embodiment, a transmit circuit 650 may couple with one or more parasitic coils, where the one or more parasitic coils (mot shown) may include one or more reactive elements, for tuning a resonant frequency of the transmitter 404 to a desired frequency. Additionally, in accordance with another exemplary embodiment, a DC current of a driver circuit 624 of the transmit circuitry 606 may be used to sense a resonant frequency condition of a wireless power system.

Figure 7:
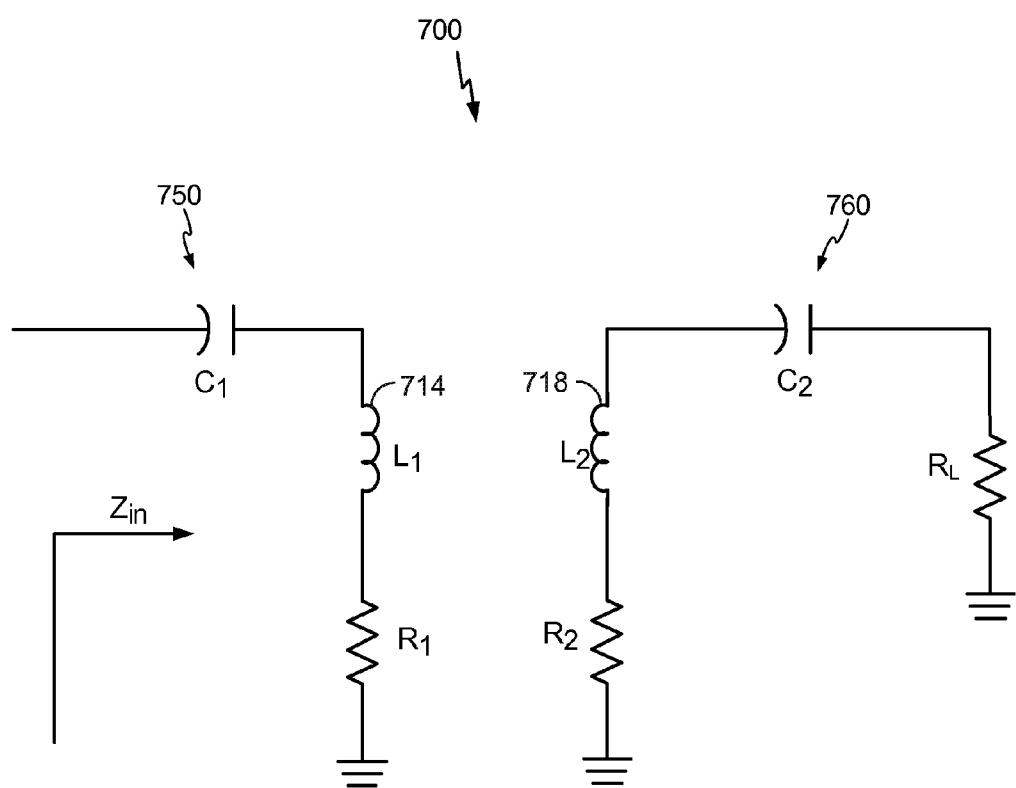
FIG. 7 is a schematic diagram of an exemplary wireless power system including a transmit circuit and a receive circuit, according to an exemplary embodiment of the present invention.

FIG. 7 is schematic diagram of an exemplary wireless power system 700 including a transmit circuit 750 and a receive circuit 760, according to an exemplary embodiment of the present invention. The transmit circuit 750 includes a transmit coil 714 having an inductance $L_1$. A resistor $R_1$ represents a parasitic resistance of the transmit circuit 750. A capacitor $C_1$ may be included (which could be the capacitance of the transmit coil 714 in some embodiments) and may be used to tune the transmit circuit 750 for resonance matching purposes. By way of example only, capacitor $C_1$ may comprise a capacitance of 27.8 pF, transmit coil 714 may have an inductance $L_1$ of 5 µH, and the parasitic resistance $R_1$ may be 5 ohms. The receive circuit 760 includes a receive coil 718 having an inductance $L_2$ and a parasitic resistance (i.e., resistor $R_2$). The receive coil 718 may also be tuned by a capacitor $C_2$ of the receive circuit 760 which may be coupled to a load, which is represented by resistor $R_L$. By way of example only, capacitor $C_2$ may comprise a capacitance of 27.8 pF, the receive coil 718 may have an inductance $L_2$ of 5 µH, and the parasitic resistance $R_2$ may be 5 ohms. The frequency of the signal used to drive the transmit circuit 750 may be 13.56 MHz. As described above, the transmit circuit 750 and the receive circuit 750 may be configured to resonate at a particular frequency. Equation 1 below shows the relationship between the frequency and values of the capacitance $C_1$ and inductance $L_1$ at resonance.

$$j\omega L_1 = \frac{1}{j\omega C_1}; \qquad \text{Equation 1}$$

where ω is the frequency in radians. The impedance ($Z_{in}$) presented to the transmit coil 714 may be given by Equation 2 below:

$$Z_{in} = R_1 + \frac{(M\omega)^2}{R_2 + R_L} \quad \text{Equation 2}$$

where M is the mutual inductance between transmit coil 714 and receive coil 718, ω is the frequency in radians, and $R_L$ is the load.

While transferring power, various operating conditions may prevent the transmit circuit 750 from resonating at a particular operating frequency. For example, the presence of metal objects and the presence of a different number of wireless power receivers may alter the impedance as presented to the transmit coil 714 and effectively change the resonant frequency of the transmit circuit 750. In this case, as the frequency of the signal driving the transmit circuit 750 may be unchanged, the signal frequency may no longer be the same as the altered resonant frequency of the transmit circuit 750. The presence of a variable number of wireless power receivers with different power requirements may also adjust the impedance presented to the transmit circuit 750 and alter the resonant frequency of the transmit circuit 750. Besides lowering the amount of power that may be wirelessly transferred, operating off resonance may decrease the efficiency of a driver circuit 624 used to drive the transmit circuit 750. This may reduce system efficiency, increase thermal dissipation, and may increase charge times when a transmitter is used to wirelessly charge a rechargeable battery. As such methods and systems that efficiently and inexpensively tune the components of the transmit circuit 750 so that the transmit circuit 750 may resonate despite changes in the resonant frequency are desirable.

Figure 8:
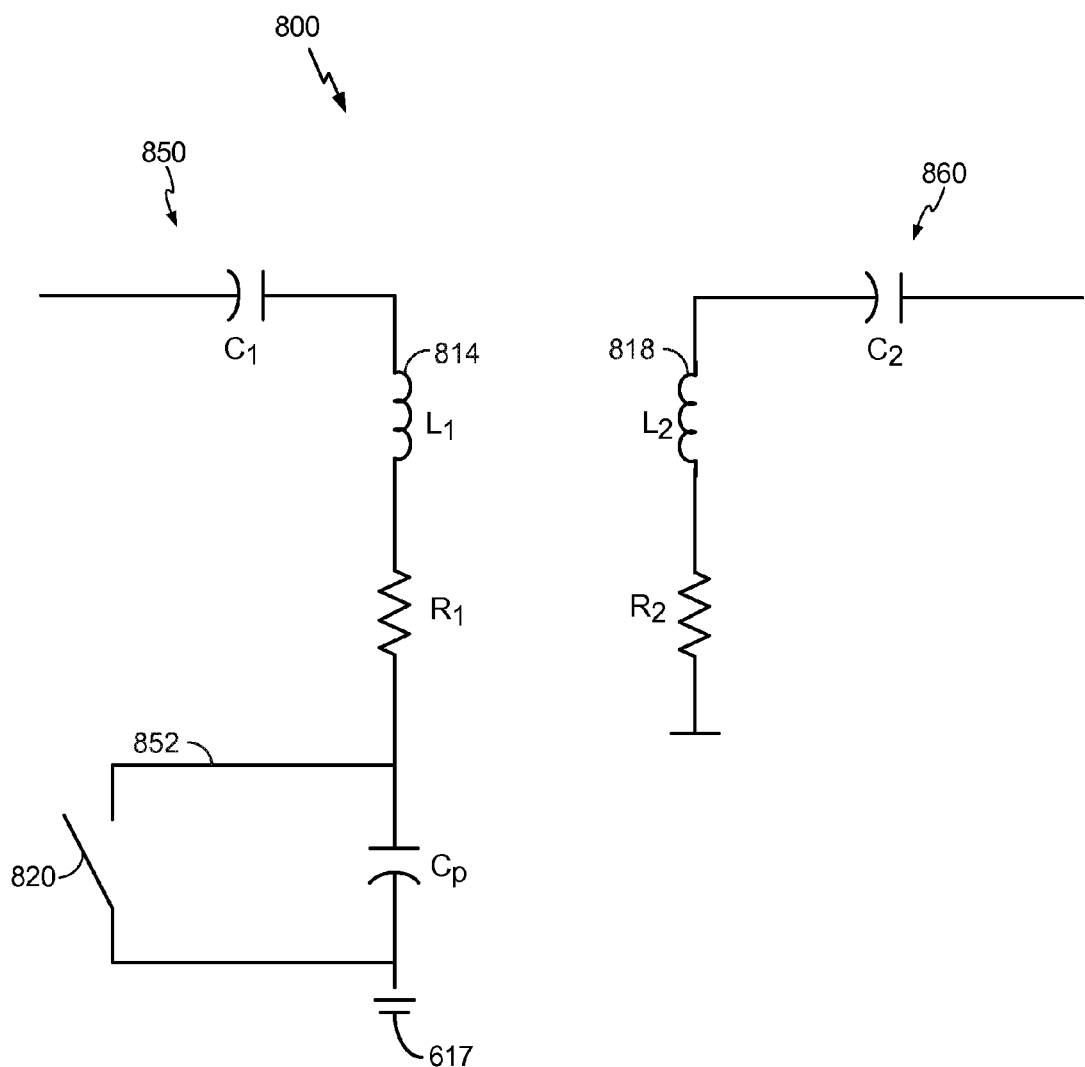
FIG. 8 is a schematic diagram of the wireless power system of FIG. 7 including an exemplary tuning circuit, according to an exemplary embodiment of the present invention.

FIG. 8 is a schematic diagram of the wireless power system 800 of FIG. 7 with an exemplary tuning circuit 852, according to an exemplary embodiment of the present invention. The wireless power system 800 includes a receive circuit 860 having a receive coil 818 having an inductance $L_2$ and a resistance $R_2$. The receive coil 818 may be tuned by a capacitor $C_2$ to resonate at a particular frequency. The wireless power system 800 also includes a transmit circuit 850 having a transmit coil 814. The transmit coil 814 has an inductance $L_1$ and resistance $R_1$, and may be tuned by capacitor $C_1$ such that it may resonate at a particular frequency. Furthermore, the transmit circuit 850 may include a tuning circuit 852 including a reactive element (i.e., a capacitor $C_p$) coupled between the transmit coil 814 and ground reference voltage 617. Moreover, reactive element $C_p$ is in parallel with a switch 820. It is noted that the term "switch" may comprise any suitable and known switching element. While switch 820 is closed, the reactive element $C_p$ may be shorted and not contribute to the impedance presented to the transmit circuit 850. As such, the impedance ($Z_{in}$) presented to the transmit coil 814 may be given by Equation 3 which is similar to Equation 2:

$$Z_{in} = R_1 + \frac{(M\omega)^2}{(R_2 + R_L)}; \quad \text{Equation 3}$$

where M is the mutual inductance between transmit coil 814 and receive coil 818, ω is the frequency in radians, and $R_L$ is the load of receiver 808.

When the switch 820 is open, the reactive element $C_p$ will contribute to the impedance presented to the transmit coil 814 and the impedance ($Z_{in}$) looking into the transmitting coil may be given by Equation 4:

$$Z_{in} = Z_{ino} + \frac{1}{j\omega C_P}; \quad \text{Equation 4}$$

where $Z_{ino}$ is the impedance looking into the transmitting coil while switch is closed as given by Equation 3. As such, controlling the switch 820 allows the tuning circuit 852 to adjust the impedance presented to the transmit circuit 850. Adjusting the impedance adjusts the reactance (i.e., adds capacitance to the transmit circuit 850) such that the resonant frequency is also adjusted as given by Equation 1. If it is detected that the transmit circuit 850 is off-resonance, the switch 820 may be opened and the adjusted impedance may tune the resonant frequency around the desired frequency (i.e., match the resonant frequency to the frequency of the signal provided at the output of the driver circuit 624 (FIG. 6)). In some cases, it may be beneficial to position the switch at the center tap of the transmit coil 814 to improve gate drive and for a balanced transmit coil 814 structure.

By way of example only, for a two percent (2%) change in the impedance ($Z_{in}$) looking into the transmitting coil, capacitor $C_p$ may be equal to fifty times the values of capacitor $C_1$ (i.e., $C_p = 50*C_1$). A series of additional reactive elements (not shown) with switches in parallel may be added to the tuning circuit 852 for additional tuning control such that the reactance may be tuned over a range of possible resonant frequencies. Selectively switching in and out different reactive elements may allow for fine tuning the transmit circuit 850 to resonate using a desired frequency over a wide range of impedances presented to the transmit coil 814.

Figure 9A:
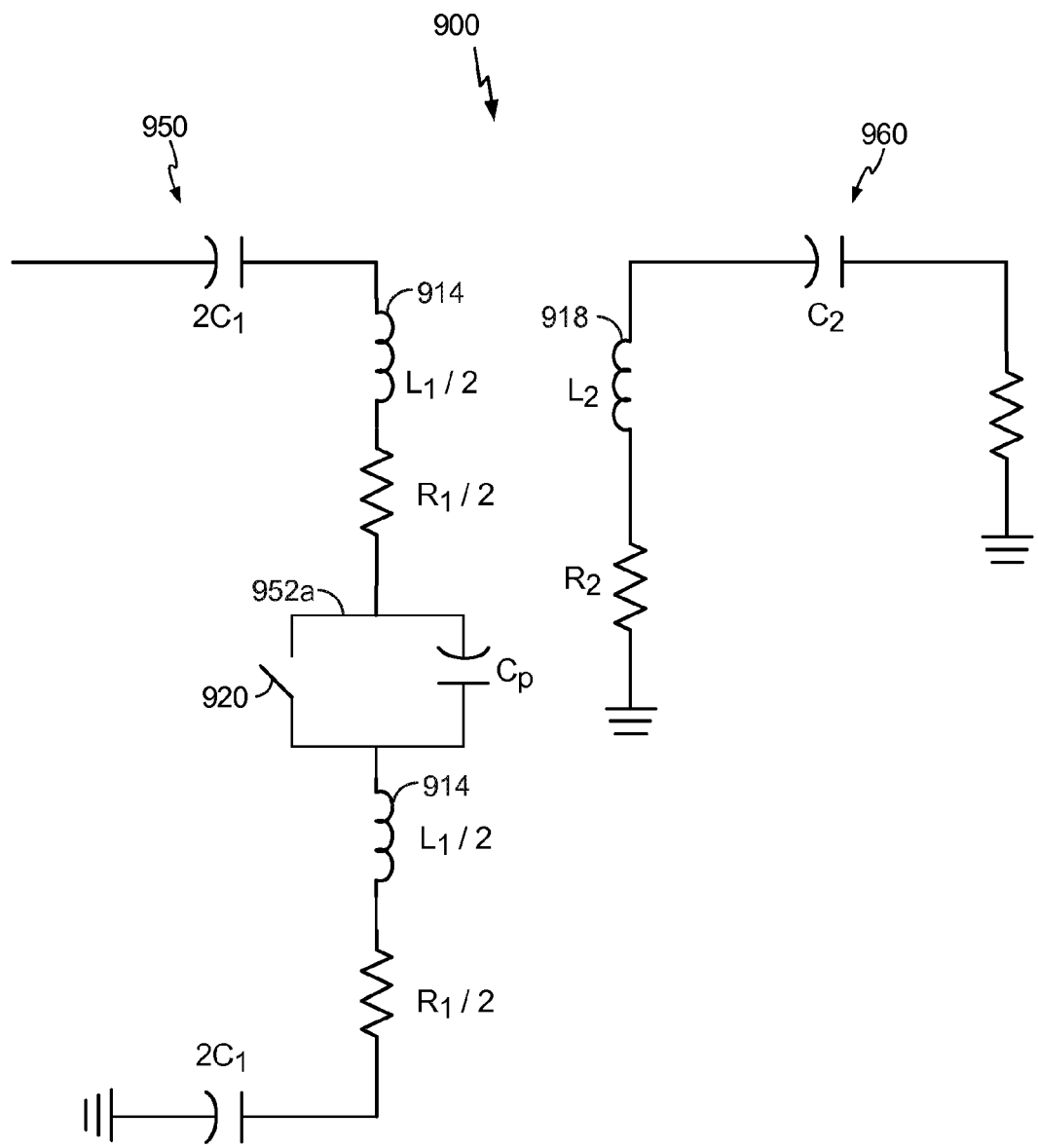
FIGS. 9A and 9B are schematic diagrams of the wireless power system of FIG. 7 including exemplary tuning circuits located at the center tap of a transmit coil, according to exemplary embodiments of the present invention.
Figure 9B:
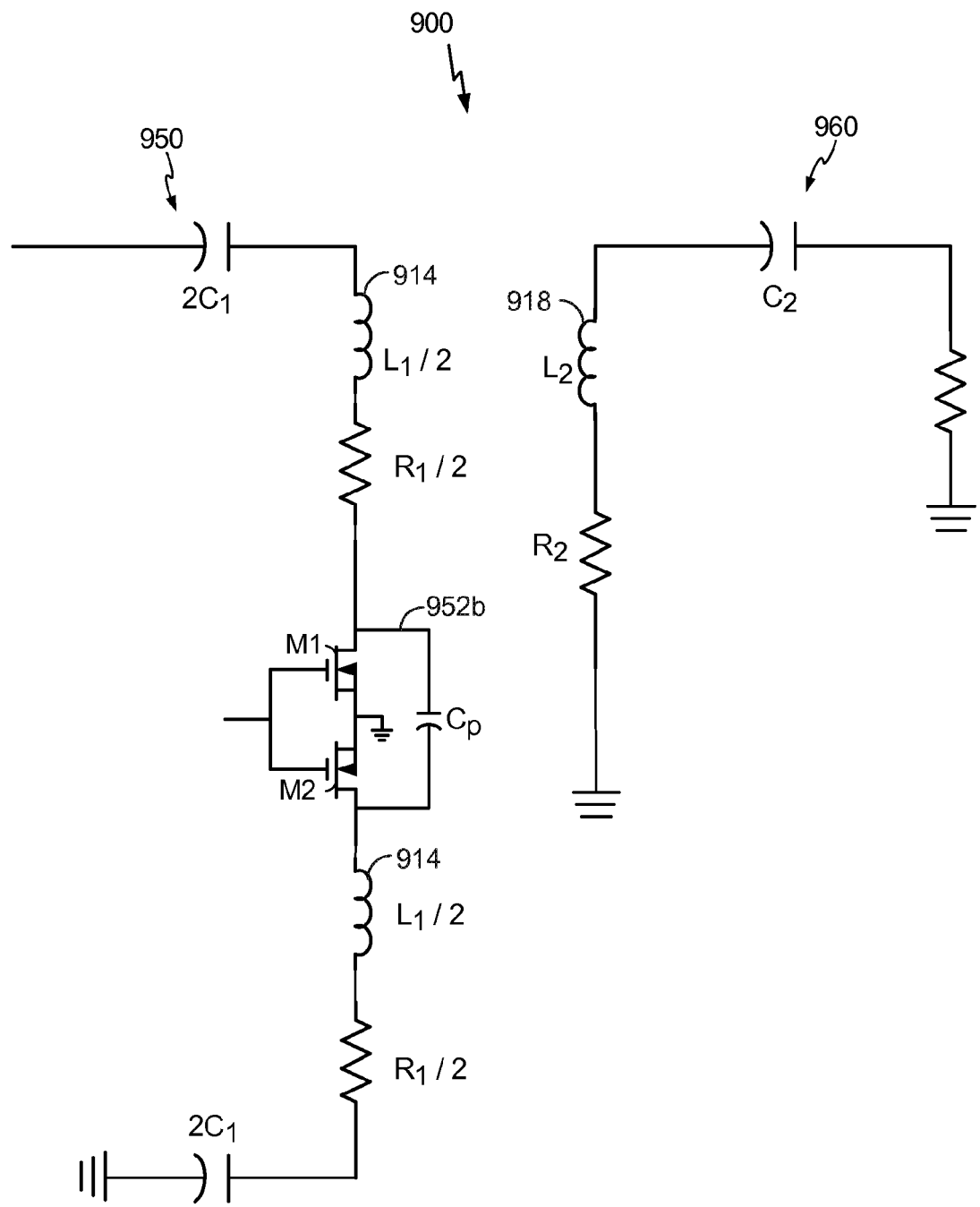

FIGS. 9A and 9B are schematic diagrams of the wireless power system of FIG. 7 including exemplary tuning circuits 952a and 952b located at the center tap of a transmit coil 914, according to exemplary embodiments of the present invention. In FIGS. 9A and 9B tuning circuits 952a and 952b are placed such that half of the inductance $L_1$ and half of the parasitic resistance $R_1$ are on either side of the tuning circuits 952a and 952b. In addition, capacitors with twice the capacitance of the capacitor $C_1$ of FIG. 8 may be placed on either side of the transmit coil 914 for a balanced configuration. FIG. 9A shows a tuning circuit 952a including a reactive element $C_p$ in parallel with a switch 920 or relay. The resistance of the relay 902 may be low such that when the switch is closed, the reactive element $C_p$ is effectively shorted and does not contribute to the impedance presented to the transmit coil 914. FIG. 9B shows a tuning circuit 952b including dual field effect transistors (FETs) M1 and M2 in parallel with the reactive element $C_p$. A virtual ground at the center of the transmit coil 714 provides a common ground reference when switching using dual FETs M1 and M2. As will be further described below, the drain-to-source capacitance of the FETs M1 and M2 may be taken into account.

Figure 10A:
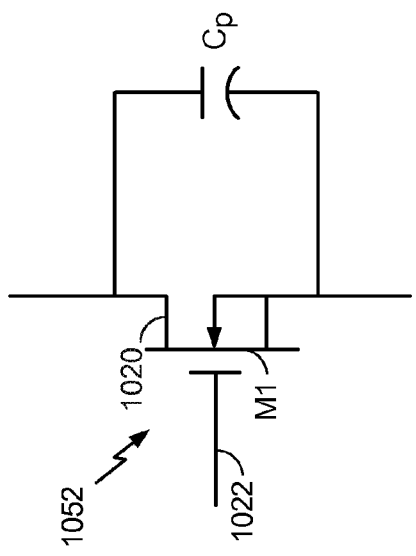
FIGS. 10A, 10B, and 10C are schematic diagrams of an exemplary tuning circuit shown in various operating states that may be used in the wireless power system of FIG. 8, according to exemplary embodiments of the present invention.
Figure 10C:
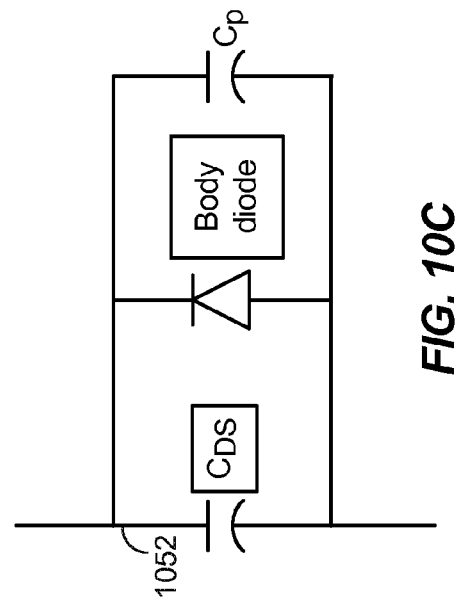
Figure 10B:
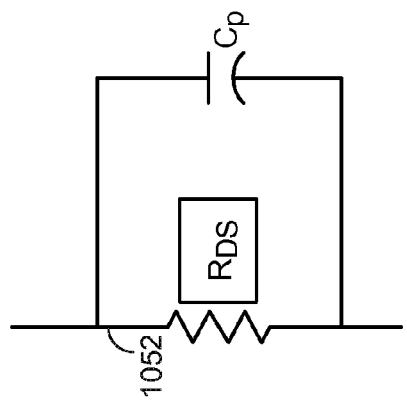

FIGS. 10A, 10B, and 10C are schematic diagrams of an exemplary tuning circuit 1052 shown in various operating states that may be used in the wireless power system 800 of FIG. 8, according to exemplary embodiments of the present invention. FIG. 10A shows a tuning circuit 1052 including switch 1020 that includes a transistor M1 having a drain coupled to one side of reactive element $C_p$, a source coupled to another side of reactive element $C_p$, and a gate coupled to a control signal 1022. FIG. 10B shows a partial schematic representation of the tuning circuit 1052 while switch 1020 is in a closed configuration where a resistance $R_{DS}$ is the drain-to-source resistance of transistor M1. FIG. 10C illustrates a partial schematic representation of the tuning circuit 1052 while switch 620 is in an open configuration illustrating a body diode and a capacitance $C_{DS}$, which is the drain-to-source capacitance of transistor M1. As an illustration, assuming, for example only, with a peak voltage of switch 620 (i.e., the transistor) at 0.7 volts, and with switch 620 open, Equations 5, 6, and 7 show the voltage, current and power as a result of the tuning circuit 1052 operation:

$$V_{C_p} = V_{FET} = 0.7 V_{peak} = 0.5 V_{rms};\quad\text{Equation 5}$$

$$I_{IN} = V_{C_p}/X_{C_p} = 0.059 A_{rms};\quad\text{Equation 6}$$

$$P_{load} = I_{IN} * I_{IN} * Z_{IN} = 0.059 W_{rms}.\quad\text{Equation 7}$$

A body diode of transistor M1 may conduct at higher power and, therefore, reactive element $C_p$ may be shorted out. Accordingly, a single transistor (i.e., a single FET) may, depending on component variables, may be suited for lower power (e.g., 0.0625 W). As shown in FIGS. 10A, 10B, and 10C, a single transistor configuration may be used for lower power system configurations.

Figure 11C:
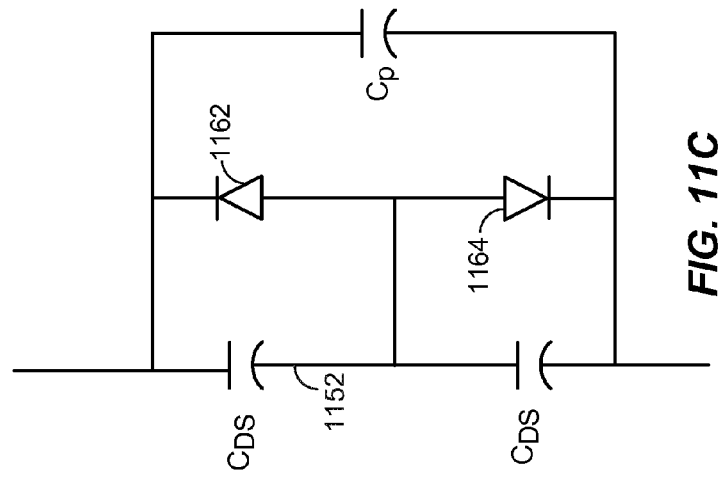
FIGS. 11A, 11B, and 11C are schematic diagrams of another exemplary tuning circuit shown in operating various states that may be used in the wireless power system of FIG. 8, according to exemplary embodiments of the present invention.
Figure 11A:
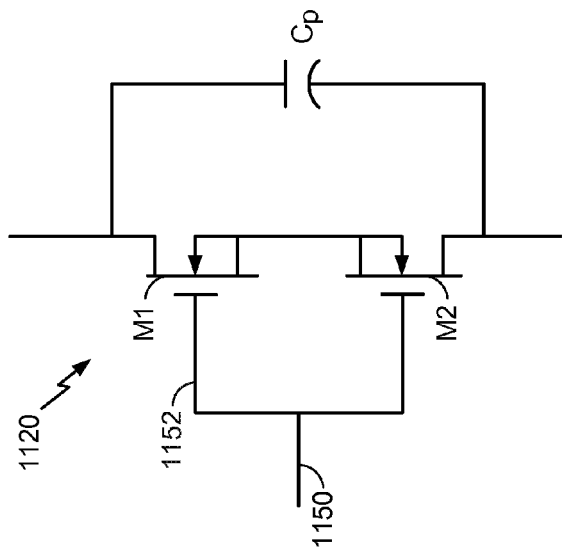
Figure 11B:
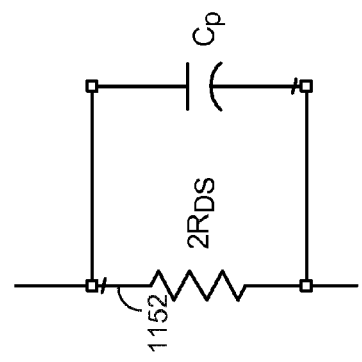

FIGS. 11A, 11B, and 11C are schematic diagrams of another exemplary tuning circuit 1152 shown in various operating states that may be used in the wireless power system 800 of FIG. 8, according to exemplary embodiments of the present invention. FIG. 11A shows a tuning circuit 1152 comprising two transistors M1 and M2 (e.g., FETs). This tuning circuit 1152 may be used for systems that may require higher power. More specifically, a switch 1120 may include a first transistor M1 having a drain coupled to one side of reactive element $C_p$ and a source coupled to a source of a second transistor M2. Furthermore, second transistor M2 has a drain coupled to another side of reactive element $C_p$. Each of first transistor M1 and second transistor M2 has a gate coupled to a control signal 1150. FIG. 11B illustrates a partial schematic representation of tuning circuit 1152 while the switch 1120 is in a closed configuration (i.e., transistors M1 and M2 are both closed) where a resistance $2R_{DS}$ is the drain-to-source resistance of transistor M1 combined with the drain-to-source resistance of transistor M2. FIG. 11C illustrates a partial schematic representation of the tuning circuit 1152 while the switch 1120 is in an open configuration (i.e., transistors M1 and M2 are both open). The schematic of FIG. 9C includes body diodes 1162 and 1164, one for each transistor M2 and M3, and two drain-to-source capacitances $C_{DS}$, one for each transistor M2 and M3. As another illustration, and assuming $V_{C_{DS}} = 0.7 V_{peak} = 0.5 V_{rms}$, Equations 8, 9, and 10 show the voltage, current and power as a result of the tuning circuit 1152 operation when the switch 1120 is open:

$$V_{C_p} = 2 * V_{C_{DS}} = 1.0 V_{rms};\quad\text{Equation 8}$$

$$I_{IN} = I_{C_p} = V_{C_p}/X_{C_p} = 0.118 A;\quad\text{Equation 9}$$

$$P_{load} = I_{IN} * I_{IN} * Z_{IN} = 0.237 W_{rms}.\quad\text{Equation 10}$$

Voltage peaks may still cause a body diode of the transistors to conduct, however, only capacitance $C_{DS}$ may be shorted out, rather than reactive element $C_p$.

With reference to FIG. 8, in some cases it may be difficult or undesirable to directly electrically connect a tuning circuit 852 along with reactive elements to the transmit circuit 850. In one embodiment, rather than directly electrically connecting reactive elements and tuning circuits to the transmit circuit 850, tuning circuits may be placed in a parasitic coil (e.g., a passive element that may wirelessly retransmit/relay energy received or transmitted from a transmit coil 814 or a receive coil 818) that is configured to couple with the transmit circuit 850 including the transmit coil 814. Tuning the reactance of a parasitic coil inductively coupled to the transmit circuit 850 may adjust the impedance presented to the transmit circuit 850 so that the transmit circuit 850 may resonate at a desired frequency as described above.

Figure 12:
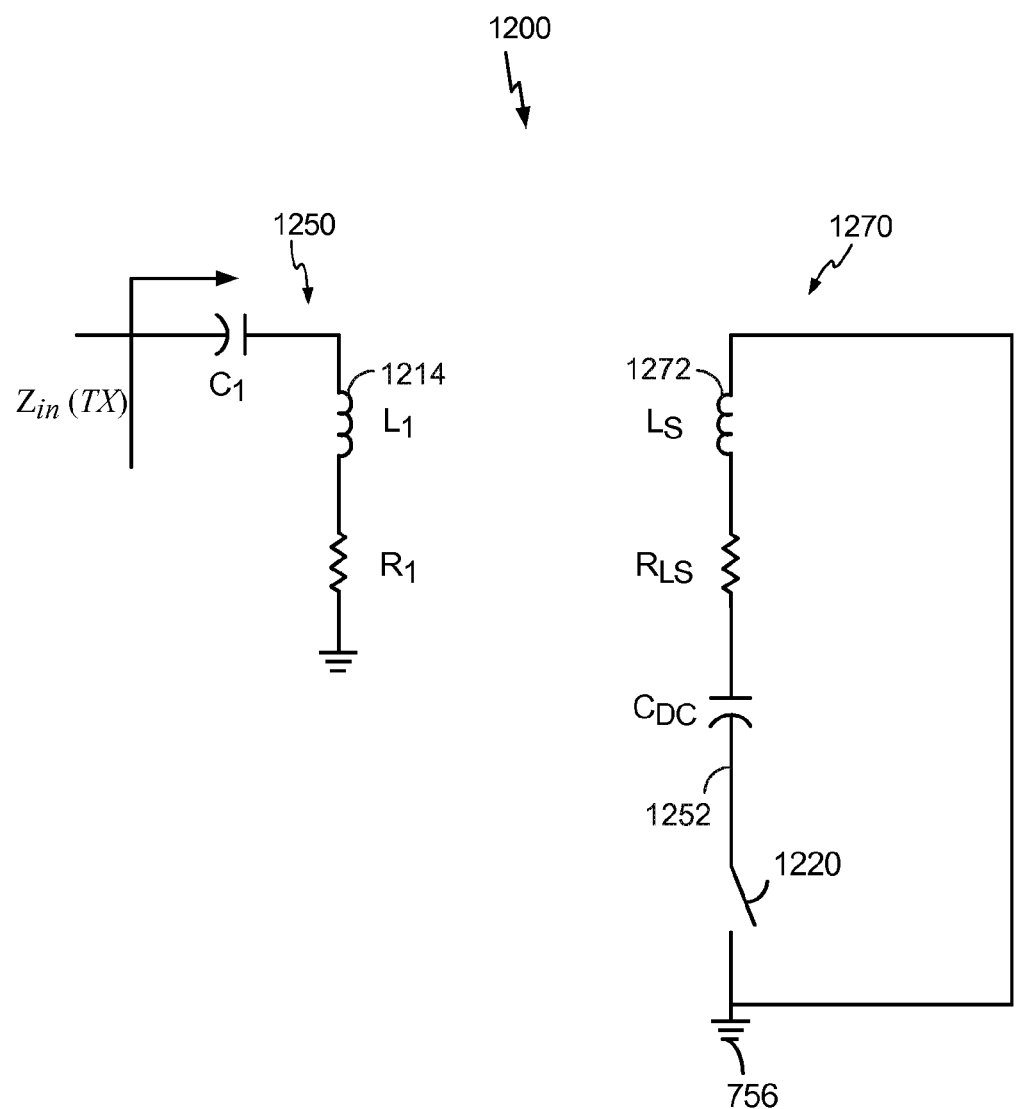
FIG. 12 is a schematic diagram of an exemplary transmit circuit and an exemplary parasitic coil circuit including a tuning circuit, according to exemplary embodiments of the present invention.

FIG. 12 is a schematic diagram of an exemplary transmit circuit 1250 and an exemplary parasitic coil circuit 1270 including a tuning circuit 1252, according to exemplary embodiments of the present invention. The parasitic coil circuit 1270 may be positioned in any suitable position in relation to a transmit circuit 1250 of a wireless power charger (e.g., at the edge of a charging pad). The transmit circuit 1250 includes a transmit coil 1214 having an inductance $L_1$ and a parasitic resistance $R_1$. The transmit circuit 1250 may be tuned by a capacitor $C_1$. Parasitic coil circuit 1270 includes a parasitic coil 1272 that may have an inductance $L_S$. The parasitic coil circuit 1270 further has a resistance $R_{LS}$ and a capacitor $C_{DC}$ that may be chosen such that the parasitic coil 1270 is configured to resonate at substantially the same operating frequency of the transmit circuit 1250. The parasitic coil circuit 1270 further includes a tuning circuit 1252 including a switch 1220 coupled between capacitor $C_{DC}$ and a ground voltage 756. By way of example only, capacitor $C_{DC}$ may comprise a capacitance of 100 nF, inductor $L_S$ may have an inductance of 0.4 μH, and resistor $R_{LS}$ may have a resistance equal to or less than 0.2 ohms. In some embodiments, switch 1220 may comprise one or more transistors. When the switch 1220 is closed, a short may be formed and the impedance presented to the transmit circuit 1250 may be given by Equation 11:

$$Z_{in}(TX) = R_1 + \frac{(M_s \omega)^2}{j\omega L_s + R_{LS} + R_{S_1}}\quad\text{Equation 11}$$

where $M_S$ is the mutual inductance between transmit coil 1214 and parasitic coil 1272, ω is the frequency in radians, and $R_{S1}$ is the resistance of the switch 1220. When the switch 1220 is open, only $C_{DC}$ remains in the parasitic coil circuit 1270 and the impedance presented to the transmit circuit 1250 may be given by Equation 12:

$$Z_{in}(TX) = R_1 + \frac{(M_s \omega)^2}{j\omega L_s + R_{LS} + X_{C_{DS}}}\quad\text{Equation 12}$$

where $X_{C_{DS}}$ is the reactance of the capacitance $C_{DC}$.

As such, by using the tuning circuit 1252, an additional reactive component may be switched into the parasitic coil circuit 1270 to adjust the impedance presented to the transmit circuit 1250. Additional parasitic capacitance may be switched in across the switch 1220 to expand the range of reactance swing presented to the transmit circuit 1250. The parasitic coil 1272 may be sized so that it is not smaller than the inner most winding of the transmit coil 1214 so that the field distribution may not be affected by the addition of the parasitic coil 1272.

Figure 13B:
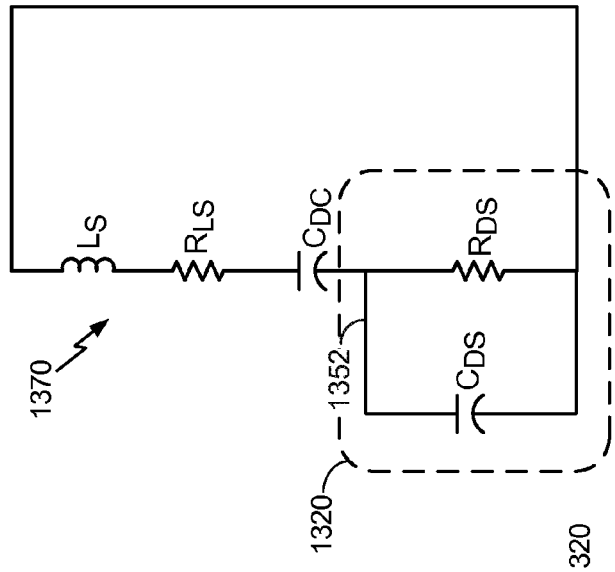
FIGS. 13A, 13B, and 13C are schematic diagrams of an exemplary tuning circuit included within a parasitic coil circuit shown in various operating states that may be used in the wireless power system of FIG. 12, according to exemplary embodiments of the present invention.
Figure 13C:
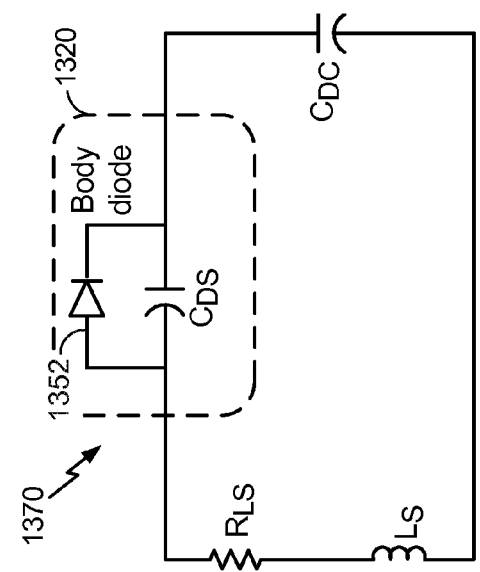
Figure 13A:
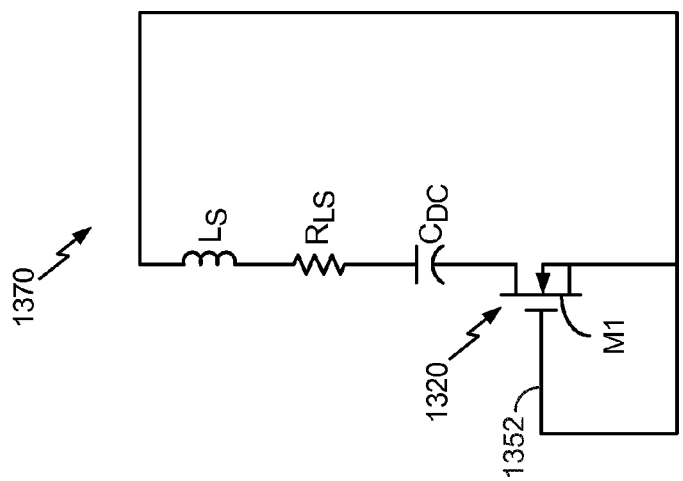

FIGS. 13A, 13B, and 13C are schematic diagrams of another exemplary tuning circuit 1352 included within a parasitic coil circuit 1370 shown in various operating states that may be used in the wireless power system 1200 of FIG. 12, according to exemplary embodiments of the present invention. FIG. 13A shows the parasitic coil circuit 1370 of FIG. 12 with a tuning circuit 1352 having a transistor M1 for a switch 1320. FIG. 13B illustrates a schematic representation of the parasitic coil circuit 1370 where the switch 1320 is in a closed configuration. As illustrated in FIG. 13B, switch 1320 includes a capacitance $C_{DS}$ and a resistance $R_{DS}$. The schematic shown in FIG. 13B may behave as a shorted coil because $R_{LS}$, $X_{CDS}$, and $R_{DS}$ may be very small. $X_{CDS}$ may be shorted by $R_{DS}$. FIG. 11C illustrates a schematic representation of parasitic coil circuit 1370 where the switch 1320 is in an open configuration. As illustrated in FIG. 11C, switch 1320 includes capacitance $C_{DS}$ and a body diode. The schematic shown in FIG. 13C may behave as a coil with a single diode half wave rectifier with a large capacitive-only load (e.g., to approximate an open circuit coil). The body diode may conduct for very brief periods at a peak voltage and only $C_{DS}$ would remain.

With reference to FIG. 12, the wireless power system 1200 having parasitic coil circuit 1270 may be initially tuned with switch 1220 in a closed configuration. Thereafter, as devices (e.g., mobile telephones) are added to a charging region of the transmit circuit 1250, the switch 1220 may be opened to increase the self-inductance of transmit circuit 1250.

As described above, in another exemplary embodiment, one or more additional reactive elements (e.g., capacitors) may be switched onto or into parasitic coil circuit 1270 in order cause parasitic coil 1272 to self-resonate. Reactive elements may be switched onto or into parasitic coil circuit 1270 in a manner similar to how reactive elements are switched onto the transmit circuit 1250, as described above with reference to FIGS. 8-11. It is noted that a transmit circuit 1250 may include a transmit coil 1214 that is configured to have at least one reactive element (not shown) switched thereon, a parasitic coil 1272 for inductively coupling with a transmit coil 1214 and configured to have at least one reactive element $C_{DC}$ switched thereon, or a combination thereof.

Figure 14:
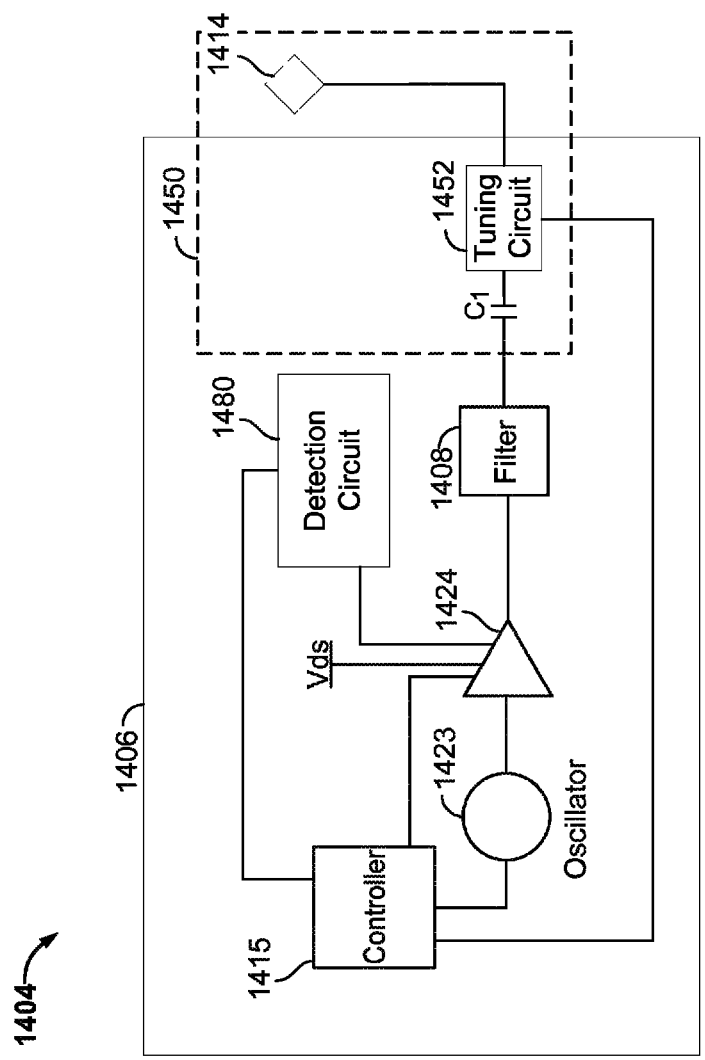
FIG. 14 is a functional block diagram of a transmitter including a portion of transmit circuitry that includes a detection circuit for detecting a change in the resonant frequency of a transmit circuit.

FIG. 14 is a functional block diagram of a transmitter 1404 including a portion of transmit circuitry 1406 that includes a detection circuit 1480 for detecting a change in the resonant frequency of a transmit circuit 1450. Similar to as shown in FIG. 4, the transmit circuitry 1406 includes a transmit circuit 1450 including a capacitor $C_1$ and a transmit coil 1414. The transmit circuit 1450 may be any of the transmit circuits described above or any combination thereof. The transmit circuitry 1406 further includes a controller 1415 and an oscillator 1423 that drives a driver circuit 1424 that may drive the transmit circuit 1450 via a filter circuit 408. To determine how and when to switch in various reactive element, a detection circuit 1480 may be used to detect a change in the resonant frequency (i.e., detect a resonant condition) of the transmit circuit 1450.

In one embodiment, the detection circuit 1480 may be able to detect an amount of current through a driver circuit 1524 to determine a change in the resonant frequency of the transmit circuit 1450. More specifically, prior to positioning any devices within a charging region of a wireless power transmitter 1404 and while a reactance of the wireless power system is zero, an amount of current through the driver circuit 1424 may be sensed using the detection circuit 1480 to determine an optimal, baseline current level at a resonance condition. Thereafter, while one or more devices are positioned within a charging region of the wireless power transmitter 1404 the current through the driver circuit 1424 may be sensed by the detection circuit 1480. In one embodiment, the detection circuit 1480 may provide information to a controller 1415 to control a tuning circuit 1452 of the transmit circuit 1450 as described above to adjust the reactance based on the amount of current. The tuning circuit 1452 may be any of the tuning circuits described above or any combination thereof. As such, the resonant frequency of the transmit circuit 1450 may be adjusted according to or more of the exemplary embodiment described above with reference to FIGS. 7-13 to adjust the measured current to resemble the baseline current and, therefore, cause the reactance of the wireless power system to get as close as possible to zero.

In one embodiment, a detection circuit 1480 may constantly monitor current levels through a driver circuit 1424 while providing power to various wireless power receivers (not shown). Based on the measured current while continuously providing power, the detection circuit 1480 may determine that the transmit circuit 1450 is no longer resonating and that the reactance of the transmit circuit 1450 needs to be adjusted or tuned back to a resonant state. A tuning circuit 1452 such as those described above may be used to adjust the reactance based on the change in current.

Figure 15:
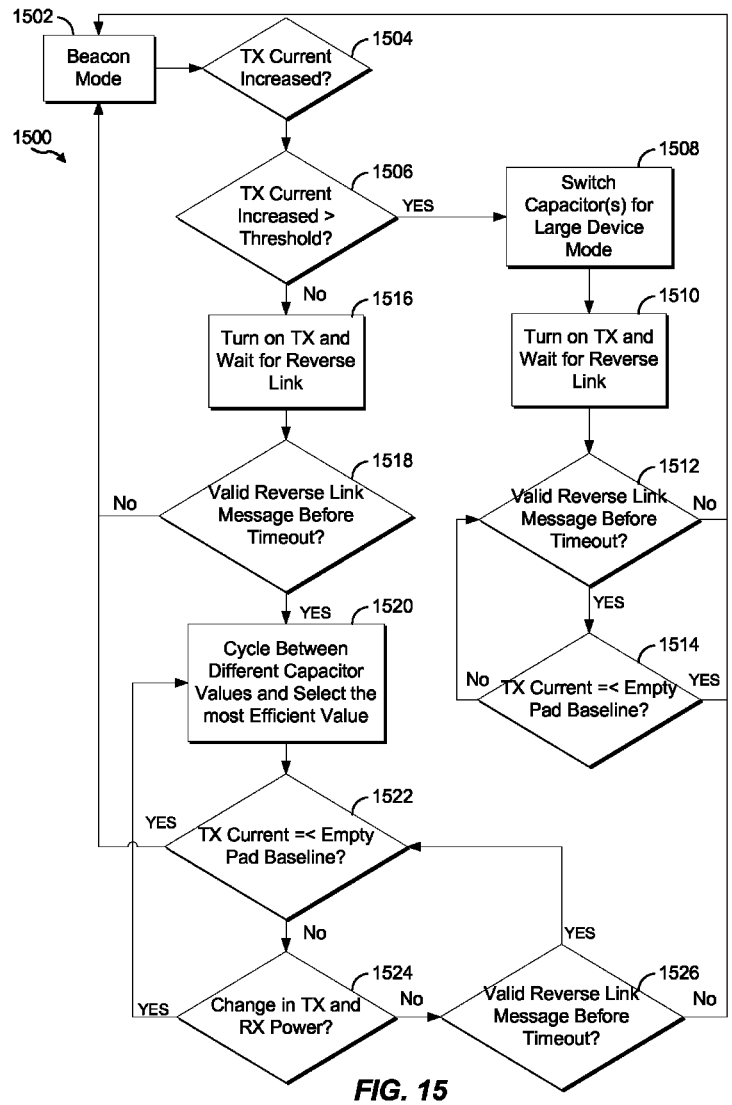
FIG. 15 is a flowchart of an exemplary method for tuning a wireless power transmitter, in accordance with an exemplary embodiment of the present invention.

FIG. 15 is a flowchart of an exemplary method 1500 for tuning a wireless power transmitter 1404, in accordance with an exemplary embodiment of the present invention that may be used while continuously providing power to one or more devices. The method 1500 may use the current at the transmitter 1404 (e.g., by measuring the current through the driver circuit 1424 using a detection circuit 1480) to detect a type of device (e.g., either a "large" device that may require a significant amount of power or a "small" device) and cycle between reactive values to obtain maximum efficiency. For example, a "large" device may be a tablet that may consume a greater amount of power than a "small device" such as a mobile phone. At block 1502, a transmitter 1404 may operate in a low power beacon mode to conserve energy when no devices are coupling power from transmitter 1404. In response to a receiver device wirelessly coupling power from the transmitter 1404, the transmitter 1404 may detect an increase in the amount of current through the transmit circuitry 1406 (e.g., through the driver circuit 1424) using a detection circuit 1480 as shown in block 1504. In decision block 1506, the detection circuit 1480 may determine whether the increase in current is above a threshold. If the increase in current is above a threshold, the transmitter 1404 may be able to detect a "large" device that may require the transmitter 1404 to make operating adjustments to be able to efficiently provide greater amounts of power.

In block 1508, for a "large" device, the transmitter 1404 may use tuning circuits 1452 to switch capacitors for a large device mode. In block 1510, the transmitter 1404 may then switch from the low power beacon mode to an active wireless power mode and start providing higher levels of power. The transmitter 1404 may also wait for a reverse link for authenticating and verifying the receiver 508. In decision block 1512, the transmitter 1404 may determine whether a valid reverse link message has been received from the receiver 508 before some timeout. If a valid message was not received, then the transmitter 1404 may re-enter the low power beacon mode. If a valid message was received, then in block 1514, the transmitter 1404 may determine whether the current is less than or equal to some empty pad baseline current amount. This current amount may correspond to where the "large" device stops coupling power from the transmitter 1404. If the current is less than or equal to the empty pad baseline current, the transmitter 1404 may re-enter the low power beacon mode. If the current is greater than the baseline current amount, then the transmitter 1404 may continue to transfer power and wait again for a valid reverse link message. As such, the transmitter 1404 and receiver 508 may periodically communicate to maintain the wireless power link until either the transmitter 1404 senses no power is being coupled (in the event that all wireless power receivers have been removed from a coupling mode region) or in the event that a previously validated receiver 508 is no longer sending reverse link messages.

If the current increase is less than or equal to the threshold in decision block 1506, then the transmitter 1404 may awake from the low power beacon mode and being wirelessly outputting higher levels of power for "small" receiver devices and wait for a reverse link message from a receiver 508 as shown in block 1516. In decision block 1518, the transmitter 1404 may determine whether a valid reverse link message has been received from a receiver 508 before some timeout amount. If no message is received, then the transmitter 1404 may re-enter the low power beacon mode shown in block 1502. If a valid message was received, then in block 1520, the transmitter 1404 may cycle between different capacitor values and select the most efficient reactance value to which to adjust the reactance of the transmit circuit 1450. For example, the transmitter 1404 may use the detection circuit 1480 and tuning circuits 1452 as described above to switch reactive elements in and out of the transmit circuit 1450 and measure an amount of current to determine the most efficient level of power transfer. The transmitter 1404 may adjust the reactance of the transmit circuit 1450 to a plurality of reactance values using the tuning circuit 1452. A detection circuit 1480 may detect an amount of current (e.g., through the driver circuit 424) for each reactance value. Based on the measured current values, the transmitter 1404 may select one of the reactance values corresponding to the reactance that corresponds to the highest efficiency (i.e., the closest to the resonance condition). The tuning circuit 1452 may then adjust the reactance of the transmit coil to the selected reactance value.

Once the most efficient operating reactance is chosen, in decision block 1522, the transmitter 1404 may determine whether the current is less than or equal to a baseline current corresponding to the current for an empty pad (e.g., to determine whether a receiver 508 has been removed or is no longer coupling power). If the current is less than or equal to the baseline current, the transmitter 1404 may determine receivers are not present and return to the low power beacon mode in block 1502. If the current is greater than the baseline current, then in decision block 1524, the transmitter 1404 may determine whether there is a change in transferred or received power. This change may be due to an additional wireless power receiver that begins to couple energy from the transmitter 1404 or other extraneous objects that may changes in the resonant frequency. If there is a change, then the transmitter 1404 may again cycle between different capacitor values and select the most efficient value as shown in block 1520 and as described above. If there is no change in power, then in decision block 1526 the transmitter 1404 may determine again whether a valid reverse link message is received from the receiver 508 before some timeout 1526. If a message was received then the transmitter 1404 may again determine whether the current is less than or equal to the empty pad baseline 1522 and so on. If a valid reverse link message was not received, then the transmitter 1404 may re-enter the low power beacon mode in block 1504. The method 1500 may therefore provide a way to adjust reactance while continuously providing power by cycling through various reactances using the tuning circuits as described above to achieve the most efficient operating state.

As such, the transmitter 1404 may be able to continuously adjust the reactance of the transmit circuit 1450 to resonate at a desired frequency while continuously providing power as receiver devices couple or stop coupling power or other extraneous objects alter the resonant frequency. The tuning circuit 1452 and detection circuit 1480 may be used to cycle through different reactances (by variably switching in and out reactive elements into the transmit circuit 1450) and detect the corresponding current to select or determine the reactance value for which the transmit circuit 1450 is closest to a resonant condition and optimum power is transferred. After cycling, the tuning circuit 1450 can adjust the reactance to a selected reactance value. Adjusting the reactance via the tuning circuit 1452 may include opening or closing a switch that is in parallel with a reactive element that is electrically connected to the transmit coil 1414. The switch may be positioned at a center tap, or in the center, of the transmit coil 1414. As described above, the tuning circuit 1452 may be in a parasitic coil circuit (not shown in FIG. 14) that may have a switch as described above.

Figure 16:
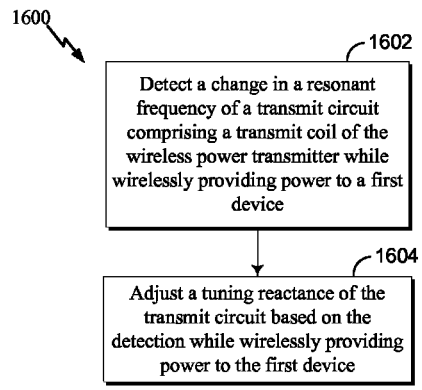
FIG. 16 is a flowchart of another exemplary method for tuning a wireless power transmitter, in accordance with an exemplary embodiments of the present invention.

FIG. 16 is a flowchart of another exemplary method 1600 of tuning a wireless power transmitter 1404. In block 1602, the transmitter 1404 may detect a change in a resonant frequency of a transmit circuit 1450 including a transmit coil 1414 while providing power to a first device. The change in resonant frequency may be due, for example, to various extraneous objects or the introduction of another wireless power receiver that begins to couple power from transmitter 1404. In one embodiment, the transmitter 1404 may detect a change in a resonant frequency by detecting a change in current (e.g., an increase) through a driver circuit 1424 of the transmitter 1404. In block 1604, the transmitter 1404 may adjust a tuning reactance of the transmit circuit 1450 based on the detection while wirelessly providing power to the first device. For example the tuning circuits described above may be used to switch in reactive elements such as capacitors into the transmit circuit 1450 so that it may resonate at a desired frequency (e.g., the frequency of the signal provided by driver circuit 1424). Adjusting the tuning reactance as shown in block 1404 may include adjusting a reactance of the transmit circuit 1450 to a plurality of reactance values, determining a respective plurality of current values by measuring the current through the driver circuit 1424 at the plurality of reactance values, selecting one of the plurality of reactance values based on the determined current values, and adjusting the reactance of the transmit circuit 1450 to the selected reactance value.

Figure 17:
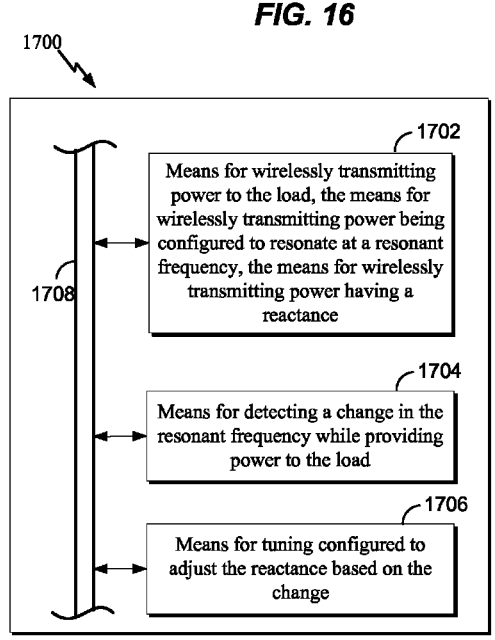
FIG. 17 is a functional block diagram of a wireless power transmitter, in accordance with an exemplary embodiment of the invention.

FIG. 17 is a functional block diagram of a wireless power transmitter 1700, in accordance with an exemplary embodiment of the invention. Wireless power transmitter 1700 comprises means 1702, 1704 and 1706 for the various actions discussed with respect to FIGS. 1-16 that in some cases may communicate via a communication link 708.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, with reference to FIG. 14 means for wirelessly transmitting power may include a transmit circuit 1450 including a transmit coil 1414. Means for detecting may include a detection circuit 1480 that is configured to detect an amount of current through, for example, a driver circuit 1424. Means for tuning may include a tuning circuit comprising a switch for switching a reactive element into the transmit circuit 1450. With reference to FIG. 8, means for wirelessly receiving power may include a receive circuit 860 including a receive coil 818. Means for wirelessly passively relaying power may include a parasitic coil circuit including a parasitic coil 1270.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer readable medium. Computer readable media includes both computer storage media and communication media including any medium that facilitates transfer of a computer program from one place to another. A storage media may be any available media that may be accessed by a computer. By way of example, and not limitation, such computer readable media may comprise RAM, ROM, EEPROM, CD ROM or other optical disk storage, magnetic disk storage or other magnetic storage devices, or any other medium that may be used to carry or store desired program code in the form of instructions or data structures and that may be accessed by a computer. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus configured to wirelessly provide power to one or more chargeable devices, the apparatus comprising:
   a transmit circuit comprising a transmit coil, the transmit circuit being configured to wirelessly provide power to a first chargeable device, the transmit circuit being further configured to resonate at a resonant frequency, the transmit circuit having a reactance, wherein the transmit circuit comprises a reactive element;
   a driver circuit configured to drive the transmit circuit;
   a detection circuit configured to
      determine a baseline current level through the driver circuit,
      detect a first change in current through the driver circuit indicating a first change in the resonant frequency in response to transmitting power to the first chargeable device, and
      detect a second change in current through the driver circuit indicating a second change in the resonant frequency in response to transmitting power to a second chargeable device while providing power to the first chargeable device; and a tuning circuit configured to
cycle the reactance of the transmit circuit through a first plurality of reactance values in response to the first change in the resonant frequency while providing power to the first chargeable device,
determine a respective first plurality of current values by measuring current through the driver circuit at the first plurality of reactance values,
select one of the first plurality of reactance values based on the baseline current level and the determined first plurality of current values in response to the first change in the resonant frequency and adjust the reactance of the transmit circuit to the selected reactance value of the first plurality of reactance values,
cycle the reactance of the transmit circuit through a second plurality of reactance values in response to the second change in the resonant frequency while providing power to the first and the second chargeable devices,
determine a respective second plurality of current values by measuring current through the driver circuit at the second plurality of reactance values,
select one of the second plurality of reactance values based on the baseline current level and the determined second plurality of current values in response to the second change in the resonant frequency and adjust the reactance of the transmit circuit to the selected reactance value of the second plurality of reactance values.

2. The apparatus of claim 1, wherein the detection circuit is configured to detect an amount of increase in the current.

3. The apparatus of claim 1, wherein the tuning circuit comprises a switch in parallel with the reactive element, and wherein the tuning circuit is configured to adjust the reactance of the transmit circuit by opening or closing the switch.

4. The apparatus of claim 3, wherein the switch is positioned at a center tap of the transmit coil.

5. The apparatus of claim 3, wherein the reactive element comprises a capacitor.

6. The apparatus of claim 1, further comprising a parasitic coil inductively coupled to the transmit coil, and wherein the tuning circuit is configured to adjust the reactance by opening or closing a switch of the parasitic coil.

7. The apparatus of claim 1, wherein the detection circuit is configured to detect an amount of current through the driver circuit and to detect the first and second changes in the resonant frequency based on the amount of current.

8. The apparatus of claim 1, wherein the tuning circuit comprises two or more transistors, the two or more transistors being in parallel with the reactive element, and wherein the tuning circuit is configured to adjust the reactance of the transmit circuit by enabling the two or more transistors.

9. The apparatus of claim 1, wherein the transmit circuit is configured to wirelessly provide power to a receive circuit of the first chargeable device to provide power to a load, the receive circuit being configured to resonate at the resonant frequency.

10. The apparatus of claim 1, wherein the transmit circuit is further configured to receive a reverse link signal from the first chargeable device before a timeout prior to the tuning circuit adjusting the reactance of the transmit coil to the first plurality of reactance values.

11. A method of tuning a wireless power transmitter for providing power to one or more chargeable devices, the method comprising:
determining a baseline current level through a driver circuit of the wireless power transmitter;
detecting a first change in current through the driver circuit indicating a first change in a resonant frequency of a transmit circuit comprising a transmit coil of the wireless power transmitter in response to transmitting power to a first chargeable device;
adjusting a tuning reactance of the transmit circuit in response to the detection of the first change in the resonant frequency while wirelessly providing power to the first chargeable device, wherein adjusting the tuning reactance in response to the detection of the first change in the resonant frequency comprises cycling a reactance of the transmit circuit through a first plurality of reactance values, determining a respective first plurality of current values by measuring the current through the driver circuit at the first plurality of reactance values, selecting one of the first plurality of reactance values based on the baseline current level and the determined first plurality of current values, and adjusting the reactance of the transmit circuit to the selected reactance value of the first plurality of reactance values;
detecting a second change in current through the driver circuit indicating a second change in the resonant frequency in response to transmitting power to a second chargeable device while providing power to the first chargeable device; and
adjusting the tuning reactance of the transmit circuit in response to the detection of the second change in the resonant frequency while wirelessly providing power to the first chargeable device and the second chargeable device, wherein adjusting the tuning reactance in response to the detection of the second change in the resonant frequency comprises cycling the reactance of the transmit circuit through a second plurality of reactance values, determining a respective second plurality of current values by measuring the current through the driver circuit at the second plurality of reactance values, selecting one of the second plurality of reactance values based on the baseline current level and the determined second plurality of current values, and adjusting the reactance of the transmit circuit to the selected reactance value of the second plurality of reactance values.

12. The method of claim 11, wherein selecting one of the first plurality of reactance values comprises selecting based on an amount of increase in the current.

13. The method of claim 11, wherein adjusting the tuning reactance comprises opening or closing a switch in parallel with a reactive element of the transmit circuit.

14. The method of claim 13, wherein the switch is positioned at a center tap of the transmit coil.

15. The method of claim 13, wherein the reactive element comprises a capacitor.

16. The method of claim 11, wherein adjusting the tuning reactance comprises opening or closing a switch of a parasitic coil circuit inductively coupled to the transmit coil.

17. The method of claim 11, wherein detecting the first and second changes in the resonant frequency comprises detecting an amount of current through the driver circuit and detecting the first and second changes in the resonant frequency based on the amount of current.

18. The method of claim 11, wherein adjusting the tuning reactance comprises enabling two or more transistors, the two or more transistors being in parallel with the reactive element of the transmit circuit.

19. The method of claim 11, wherein the first chargeable device comprises a receive circuit configured to wirelessly receive power from the transmit circuit, the receive circuit being configured to resonate at the resonate frequency.

20. The method of claim 11, further comprising receiving a reverse link signal from the first chargeable device before a timeout prior to adjusting the tuning reactance of the transmit circuit in response to the detection of the first change in the resonant frequency.

21. An apparatus configured to wirelessly provide power to one or more chargeable devices, the apparatus comprising:
- means for wirelessly transmitting power to a first chargeable device and a second chargeable device, the means for wirelessly transmitting power being configured to resonate at a resonant frequency, the means for wirelessly transmitting power having a reactance;
- means for driving the means for wirelessly transmitting power;
- means for determining a baseline current level through the means for driving;
- means for detecting a first change in current through the means for driving indicating a first change in the resonant frequency in response to transmitting power to the first chargeable device;
- means for detecting a second change in current through the means for driving indicating a second change in the resonant frequency in response to transmitting power to a second chargeable device while providing power to the first chargeable device; and
- means for tuning configured to
  - cycle the reactance of the means for wirelessly transmitting power through a first plurality of reactance values in response to the first change in the resonant frequency while wirelessly providing power to the first chargeable device,
  - determine a respective first plurality of current values by measuring current through the means for driving at the first plurality of reactance values,
  - select one of the first plurality of reactance values based on the baseline current level and the determined first plurality of current values and adjust the reactance of the means for wirelessly transmitting power to the selected reactance value of the first plurality of reactance values,
  - cycle the reactance of the means for wirelessly transmitting power through a second plurality of reactance values in response to the second change in the resonant frequency while wirelessly providing power to the first chargeable device and the second chargeable device,
  - determine a respective second plurality of current values by measuring current through the means for driving at the second plurality of reactance values,
  - select one of the second plurality of reactance values based on the baseline current level and the determined second plurality of current values and adjust the reactance of the means for wirelessly transmitting power to the selected reactance value of the second plurality of reactance values.

22. The apparatus of claim 21, wherein the means for detecting the first change in current is configured to detect an amount of increase in the current.

23. The apparatus of claim 21, wherein the means for wirelessly transmitting power comprises a reactive element, wherein the means for tuning comprises a switch in parallel with the reactive element, and wherein the means for tuning is configured to adjust the reactance of the means for wirelessly transmitting power by opening or closing the switch.

24. The apparatus of claim 23, wherein the switch is positioned at a center tap of the means for wirelessly transmitting power.

25. The apparatus of claim 23, wherein the reactive element comprises a capacitor.

26. The apparatus of claim 21, further comprising a means for wirelessly passively relaying power inductively coupled to the means for wirelessly transmitting power, and wherein the means for tuning is configured to adjust the reactance by opening or closing a switch of the means for wirelessly passively relaying power.

27. The apparatus of claim 21, wherein the means for detecting a first change in current is configured to detect an amount of current through the means for driving to detect the first change in the resonant frequency based on the amount of current.

28. The apparatus of claim 21, wherein the means for wirelessly transmitting power comprises a reactive element, wherein the means for tuning comprises two or more transistors, the two or more transistors being in parallel with the reactive element, and wherein the means for tuning is configured to adjust the reactance of the transmit circuit by enabling the two or more transistors.

29. The apparatus of claim 21, wherein the means for wirelessly transmitting is configured to wirelessly provide power to the first chargeable device to provide power to a load, the first chargeable device being configured to resonate at the resonant frequency.

30. The apparatus of claim 21, wherein the means for wirelessly transmitting power comprises a transmit circuit comprising a transmit coil.

31. The apparatus of claim 21, wherein the means for detecting a first change in current comprises a detection circuit, and wherein the means for tuning comprises a tuning circuit.

32. The apparatus of claim 26, wherein the means for wirelessly passively relaying power comprises a parasitic coil circuit comprising a parasitic coil.

33. The apparatus of claim 29, wherein the first chargeable device comprises a receive circuit comprising a receive coil.

34. The apparatus of claim 21, further comprising means for receiving a reverse link signal from the first chargeable device before a timeout prior to the means for tuning adjusting the reactance of the means for wirelessly transmitting power to a first plurality of reactance values.

* * * * *